United States Patent Office 2,865,841
Patented Dec. 23, 1958

2,865,841

HYDROCRACKING WITH A CATALYST COMPRISING ALUMINUM, OR ALUMINUM CHLORIDE, TITANIUM TETRACHLORIDE, AND HYDROGEN CHLORIDE

James Hoekstra, Evergreen Park, Ill., assignor to Universal Oil Products Company, Des Plaines, Ill., a corporation of Delaware No Drawing. Application September 21, 1953
Serial No. 381,506

4 Claims. (Cl. 208—108)

This invention relates to a novel catalyst composite and more particularly to a catalyst and process for effecting selective low temperature hydrocracking of a petroleum fraction.

In a specific embodiment the present invention relates to a catalyst comprising hydrogen halide, a component selected from the group consisting of aluminum and aluminum halide, and a component selected from the group consisting of compounds of silicon, titanium, zirconium, hafnium and thorium.

Another embodiment of the present invention relates to a process for effecting the conversion of an organic material which comprises contacting said organic material at conversion conditions with a catalyst comprising hydrogen halide, aluminum or aluminum halide, and a component selected from the group consisting of compounds of silicon, titanium, zirconium, hafnium and thorium.

In another embodiment the present invention relates to a process for effecting the hydrocracking of a hydrocrackable material which comprises contacting said material at hydrocracking conditions with a catalyst comprising hydrogen halide, aluminum or aluminum halide, and a component from the group consisting of compounds of silicon, titanium, zirconium, hafnium and thorium.

In a specific embodiment the present invention relates to a process for selectively hydrocracking a hydrocrackable material by contacting the material to be hydrocracked at a temperature in excess of about 250° F. and a pressure of from about 100 p. s. i. to about 10,000 p. s. i. or more, in the presence of hydrogen, with a catalyst comprising hydrogen halide, aluminum or aluminum halide, and a component from the group consisting of compounds of silicon, titanium, zirconium, hafnium, and thorium.

Catalytic cracking processes have long been used and are well known in the petroleum art. For the most part catalytic cracking processes comprise contacting a selected charge stock, usually gas oil, with a solid siliceous catalyst typified by silica-alumina at temperatures in excess of 750° F. and generally from about 850° F. to 950° F. This process is highly successful and produces good yields of gasoline, however, the process has distinct limitations which narrow its scope of operation. Ordinary catalytic cracking processes have high losses of material which are due to over cracking, that is the formation of normally gaseous material such as hydrocarbons having from 1 to 4 carbon atoms. Further losses are experienced by the formation of coke which is the result of continuous polymerization and hydrogen transfer reactions resulting in high molecular weight material having an extremely high carbon to hydrogen ratio which deposits on the catalyst in the form of a black carbonaceous solid material that covers the active surface and must be burned therefrom in order to at least partially restore the activity of the catalyst. A disadvantage of conventional catalytic cracking is that the product, although having high octane number, is unsaturated.

A limitation of a conventional catalytic cracking process is that its charging stock is limited to gas oils, straw oils or other relatively light material which is preferably of a predominantly straight run character. When heavy carbonaceous material such as residuum fractions are treated with ordinary catalytic cracking techniques, there results an extremely large yield of coke which overburdens the regeneration portion of the plant in that an excessive amount of burning is required to remove this coke. Besides overburdening the regenerator, the high temperatures of excessive regeneration damage the catalyst and cause undesirable thermal effects on the equipment. Conventional catalytic cracking of residuum fractions results in the formation of large quantities of normally gaseous material because of the severe conditions required. The liquid product is highly unsaturated since the large molecules contained in a residuum fraction frequently must be fractured several times in order to form material that boils in the gasoline fraction.

Catalytic cracking is an improvement over thermal cracking processes in that the cracking effected in the presence of a catalyst is not so random as the cracking effected thermally, however the selectively of catalytic cracking processes leaves much to be desired. Even though a silica-alumina catalyst has a tendency to direct the severance towards centrally located bonds and thereby make a more selective process, the high temperature at which the process is effected causes undesired thermal effects.

The present invention provides a process which substantially eliminates the above difficulties. The catalyst of the present invention permits cracking reactions to be effected at substantially lower temperatures than may be achieved in conventional cracking units, that is in the range of about 250° F. and higher. At these low temperatures there are a minimum of thermal effects. Furthermore, the unique catalyst of the present invention tends to direct the severance of carbon to carbon bonds towards centrally located bonds thereby causing the formation of a higher proportion of gasoline and a lower proportion of normally gaseous materials. The process of the present invention is preferably effected at conditions favorable to hydrogenation and therefore the product formed is a stable saturated material. A corollary advantage to the saturation of the product is that the formation of carbonaceous deposits is greatly retarded in that the hydrogenating conditions existing in the reaction zone tend to saturate the unsaturated fragments of cracked molecules thereby preventing their polymerization and the resultant coke deposit on the catalyst so that the overall result is that virtually all molecules tend to be cracked to smaller molecules. In preventing the formation of coke, not only is the catalyst life increased and the need for regeneration reduced or eliminated, but an increase in yield corresponding to the weight of the coke normally formed is realized.

Although the high octane rating of cracked gasoline can be largely attributed to the high percentage of olefinic material contained therein, the saturated product of this process does not have a correspondingly low octane rating because the catalyst used in this process, as well as the operating conditions of the process, are favorable towards isomerization reactions. The product of this process contains highly branched chain, saturated molecules which have substantially higher octane characteristics than the paraffinic material found in straight run or mildly cracked stocks.

Inasmuch as coke forming effects in the present process are minimized the process of the present invention is suitable for converting a wide variety of charge stocks ranging from kerosenes and gas oils to residuum fractions and even to coal paste, shale, tar sands, etc. The catalyst of the present invention may be in the form of a slurry, a liquid or a solid, depending upon which components are used. Thus, the form may be selected to be especially suitable for a particular charge stock. For example, when it is desired to convert a shale or tar sand it is preferable that the catalyst be a liquid at conversion conditions, for example the catalyst may comprise aluminum chloride, hydrogen chloride and titanium tetrachloride. The product stream resulting from this conversion will contain liquid hydrocarbon, liquid catalyst and inert solids, and will be a slurry from which the inert solid material may easily be separated by filtration, settling, centrifuging, etc. When the charge stock is a liquid or gas the catalyst may comprise a slurry of aluminum chips, pellets or shavings contained in a mixture of hydrogen chloride and titanium tetrachloride or it may be a solid bed of aluminum chips and zirconium tetrabromide through which the charge stock, which may be mixed with hydrogen bromide or alkyl bromide, is passed.

As hereinbefore stated, the catalyst of the present invention comprises hydrogen halide, aluminum or aluminum halide, and a component selected from the group consisting of compounds of silicon, titanium, zirconium, hafnium, and thorium. The hydrogen halide is preferably hydrogen chloride, however hydrogen bromide or hydrogen iodide may be used especially when the aluminum component of the catalyst is aluminum bromide or aluminum iodide. The aluminum component of the catalyst is preferably aluminum metal, however, as hereinbefore stated, aluminum chloride, aluminum bromide or aluminum iodide may be used. When the aluminum component of the catalyst is aluminum metal, it is desirable that high purity aluminum be used to avoid adverse effects on the catalyst activity due to contaminants contained in the aluminum.

The compounds of silicon, titanium, zirconium, hafnium, and thorium which are used are preferably their halides. Especially preferred are the tetrachlorides of silicon, titanium and zirconium but many other compounds may be used including silicon tetrabromide, silicon chlorohydrosulfide, titanium tetrabromide, titanium oxylate, zirconium oxybromide, hafnium tetrachloride, thorium tetrachloride, etc.

The proportion of the various components in the catalyst to other components or to the quantity of charge stock may be varied to cause whatever effects are desired. As is well known, the liquid hourly space velocity may be decreased when a greater amount of reaction is desired and vice versa. Similarly, the proportion of hydrogen halide to aluminum may be varied as well as the proportion of either or both of the latter components to titanium tetrachloride etc. Usually the silicon, titanium, zirconium, hafnium or thorium component will be present in a concentration of from about 5 wt. percent to about 300 wt. percent of the aluminum or more. The ratio of hydrogen chloride to aluminum may vary from 0.1 to about 10 mols of hydrogen chloride per mol of aluminum or more.

The process of this invention is essentially a low temperature process, that is, it is preferably practiced in the temperature range of from about 250° F. to about 700° F. however, for special situations higher temperatures may be employed. For example, when it is desired to use the catalyst of this invention to effect cracking of a low boiling material such as gasoline or selected fractions such as butane, pentane, hexane, etc., it may be necessary to operate at higher temperatures such as in the range of 1000° F. to 1500° F. or more. It may also be necessary to operate at higher temperatures, say from about 700° F. to about 1000° F., when the charge stock is a highly refractory material such as a gas oil fraction containing a high percentage of aromatic material or a cycle stock from a conventional cracking unit.

The process and catalyst of this invention may be used to effect other reactions than hydrocracking when the operating conditions and charge stocks are suitably adjusted. Thus, for example, when a straight run gasoline is processed with a catalyst consisting of hydrogen chloride, aluminum and titanium tetrachloride under a hydrogen pressure of from about 100 p. s. i. to about 500 p. s. i. and at a temperature of from about 600° F. to about 900° F., the gasoline will be reformed to produce branched chain isomers of the straight chain molecules contained in the charge stock and some aromatic compounds resulting from the dehydrogenation of the naphthenic compounds contained in the charge stock. The catalyst of this invention may also be used to effect treating reactions for the removal of small quantities of contaminants from a fraction, such as the desulfurization or removal of combined nitrogen from gasoline, hydrogenation reactions etc.

When reactions other than hydrocracking are to be effected, the process of this invention may be practiced in the presence of other gases than hydrogen. For example, the process may be practiced at atmospheric pressures and under superatmospheric pressure of such gases as nitorgen, hydrocarbon gases, carbon monoxide, carbon dioxide or mixtures of these with each other and/or with hydrogen.

The process of this invention is preferably practiced in the presence of hydrogen at superatmospheric pressure since hydrogenation is favored by high pressures. Ordinarily pressures of from about 1000 p. s. i. to about 3000 p. s. i. will be used, however, lower pressures may be used and in special cases high pressures such as 5000 or even 20,000 p. s. i. may be used. An example of a particular process wherein the pressure must be closely controlled is where it is desired to produce an unalkylated aromatic compound by a combination process consisting of dealkylating aromatics, saturating the dealkylated side chain to form paraffins and subsequently recovering the resultant aromatic molecules from the resultant paraffinic materials. In such a process it is desirable to use only sufficient hydrogen pressure to effect the saturation of the olefinic material resulting from the dealkylation, but not enough pressure to effect the hydrogenation of the aromatic material which is a desired end product. In such a process it is preferred to use a moderate hydrogen pressure of from about 75 p. s. i. to about 300 p. s. i. since the saturation of olefinic material may be readily accomplished under conditions at which aromatic material is not affected.

Ordinarily, only the amount of pressure that is required will be used since the excessive cost of high pressure equipment is a limiting factor. The present process, however, minimizes the cost of high pressure equipment in that the low temperatures required in the reaction zone permits vessels and pipes to have thinner walls and therefore be procured at lesser cost.

The catalyst of this invention may be used in any suitable processing method. The catalyst may be a liquid or slurry or solid contained in a single vessel and the charge stock to be converted may be passed into the catalyst in an upflow manner when the charge stock is less dense. When the catalyst is contained in a single vessel the charge stock may be introduced through a spray nozzle in the bottom of the vessel so as to cause turbulence in the reaction zone as well as to cause the charge stock to be in subdivided form. Turbulence may also be caused in the reaction zone by introducing the hydrogen-containing gas separately through jets or nozzles, however, it is preferred to commingle the charge stock and the hydrogen-containing gas prior to introduction of the charge into the reaction zone so that the hydrogen may be at least partially dissolved in the charge stock and thereby be more intimately associated with the charge stock in the reaction zone. It is especially desirable to commingle the charge stock and the hydrogen prior to introduction when both the charge stock and hydrogen are in the gas phase when introduced into the reaction zone.

The process of the present invention may also be practiced as a slurry or fluidized process wherein catalyst and charge stock are commingled, passed concurrently through a reaction zone and subsequently separated or where the catalyst is suspended in a stream of charge stock in the reaction zone. Generally the process will comprise a reaction zone wherein the catalyst and charge stock are commingled at processing conditions followed by at least one separation zone wherein the product of the reaction is separated from the catalyst and into its various fractions. The process will generally provide for a recycle stream containing material that passed through the reaction zone that was not converted and material that was cracked but not sufficiently to be in the gasoline boiling range. This recycle stream passes from the separation zone to the reaction zone. The process may also provide for a regeneration zone to prevent a buildup of the small amount of coke that is formed. In the regeneration zone carbonaceous material resulting from the reaction may be removed from the catalyst by oxidation or by other means such as filtration, flotation etc. The regeneration zone is preferably a zone remote from the reaction zone which is provided with an inlet for oxygen-containing gas and an outlet for spent flue gas. The conduits between the reaction zone and the regeneration zone will be arranged to form a seal which prevents the gaseous material from passing between zones. When the process reactions are endothermic, as for example, cracking reactions, an oxidative regeneration zone will have the advantage of supplying the necessary heat of reaction as well as the advantage of purifying the catalyst to increase its activity.

The hydrogen-containing gas that is present in the reaction zone need not be a particularly pure gas as it may contain up to 50% or more of materials such as normally gaseous hydrocarbons, carbon monoxide, carbon dioxide, etc. The hydrogen-containing gas may be obtained from such sources as the normally gaseous material produced from the cracking reactions of this process which may be recycled to the reaction zone or the effluent from other refining processes such as reforming processes. The process of the present invention effects purification of the charge stock at least to some extent by causing the hydrogenation of combined sulfur and combined nitrogen contained in the hydrocarbon molecule to form hydrogen sulfide, ammonia, and a residual hydrocarbon molecule. The resulting hydrogen sulfide and ammonia are removed from the gasoline fraction in the subsequent separation and will appear in the normally gaseous products from the separation zone. It is frequently desirable, when the charge stock contains a high percentage of sulfur and the normally gaseous material is recycled, to provide for purification of the recycle gas so that the contaminants in the recycle gas stream will be maintained at a low level.

Following are several examples which are intended only to illustrate the process of the present invention and are not intended to limit unduly the scope of this invention to the particular process or material used.

EXAMPLE I 200 ml. of heavy white mineral oil, 10 grams of anhydrous aluminum chloride and 11 grams of anhydrous HCl were placed in a glass lined rotating autoclave under a pressure of 110 atmospheres of hydrogen at a temperature of 340° F. for a period of 5 hours. In a second autoclave 200 ml. of heavy white mineral oil, 5 grams of 20–40 mesh atomized 99.9% aluminum metal and 26 grams of anhydrous hydrogen chloride were placed under a pressure of 110 atmospheres of hydrogen and heated to a temperature of 340° F. for 5 hours. After the 5-hour period both autoclaves were allowed to cool and the contents of each were discharged. Upon examination the following results were obtained.

Table I

| Run No. | 1 | 2 |
|---|---|---|
| Catalyst | AlCl$_3$+HCl | Al+HCl |
| Liquid recovery, vol. percent of charge | 83.0 | 76.6 |
| Gas, vol. percent of charge | 27.0 | 45.9 |
| Gas (other than H$_2$) wt. percent of charge | 27.1 | 15.0 |
| Coke, wt. percent of charge | 15.0 | 15.4 |

It may be seen from Example I that aluminum chloride-hydrogen chloride mixtures exhibit high cracking activity, however, the cracking is not selective which is illustrated by the low liquid yields, high production of normally gaseous material and high yield of coke. Subsequent examples illustrate the improved result obtained by using the catalyst of the present invention.

EXAMPLE II 200 ml. of Mid-Continent gas oil, 5 grams of steam atomized 20–40 mesh 99.9% aluminum metal and 24 grams of anhydrous HCl were placed in a glass lined rotating autoclave under a pressure of 110 atmospheres of hydrogen and heated to a temperature of 340° F. for a period of 5 hours. After the 5-hour period the autoclave was allowed to cool and its contents were subsequently discharged. Upon examination the contents were found to contain 21 liquid volume percent based on the volume charged all of which boiled in the gasoline range. The gaseous product amounted to 13.7 wt. percent based on the weight of material charged and coke formation was 15 wt. percent.

EXAMPLE III 200 ml. of heavy white mineral oil, 5 grams of 20–40 mesh steam atomized 99.9% aluminum metal, 10 grams of titanium tetrachloride and 19 grams of anhydrous hydrogen chloride were placed in a glass lined rotating autoclave under a pressure of 110 atmospheres of hydrogen and heated to a temperature of 340° F. for 5 hours. The autoclave was cooled and the contents discharged and upon examination were found to contain 110 liquid vol. percent based on charge stock of which 34 vol. percent boiled in the gasoline range. 2.2 wt. percent of the original charge was gaseous material, the amount of coke formed was 1.2 wt. percent of the original charge. The value for the weight of coke is obtained by subtracting the weight of catalyst originally charged from the weight of sludge contained in the bomb.

EXAMPLE IV 200 ml. of heavy white mineral oil, 5 grams of 20–40 mesh atomized 99.9% aluminum metal, 10 grams of titanium tetrachloride and 31 grams of anhydrous hydrogen chloride were placed in a glass lined rotating autoclave under a pressure of 110 atmospheres of hydrogen and heated to a temperature of 340° F. for 5 hours. After the 5 hour period the autoclave and its contents were cooled and the contents discharged. Upon examination the autoclave was found to contain 90 liquid vol. percent of the original charge of which 59.2 vol. percent boiled in the gasoline range. Normally gaseous material amounting to 9.6 wt. percent of the original charge was produced and 10.7 wt. percent of the original charge was in the form of coke.

EXAMPLE V 200 ml. of Mid-Continent gas oil, 10 grams of 20–40 mesh aluminum metal, 20 grams of silicon tetrachloride and 36 grams of anhydrous hydrogen chloride were placed in a glass lined rotating autoclave under a pressure of 110 atmospheres of hydrogen and heated to a temperature of 340° F. for 5 hours after which its contents were cooled and discharged. Upon examination the autoclave was found to contain 98 liquid vol. percent based on the volume of charge of which 45 vol. percent boiled in the gasoline range. The normally gaseous material produced was 1.5 wt. percent based on the weight of charge and the production of coke amounted to 6.5 wt. percent based on the weight of charge.

EXAMPLE VI 200 ml. of Mid-Continent gas oil, 10 grams of 20–40 mesh aluminum metal, 20 grams of zirconium tetrachloride and 39 grams of anhydrous hydrogen chloride were charged to a glass lined rotating autoclave under a pressure of 110 atmospheres of hydrogen and heated to a temperature fo 340° F. for 5 hours after which its contents were cooled and discharged. Upon examination the autoclave was found to contain 103 liquid vol. percent based on the liquid charged of which 30.6 vol. percent boiled in the gasoline range. The normally gaseous material produced was 1.8 wt. percent based on the weight of material charged and the production of coke was 12.2 wt. percent based on the weight of charge.

From the foregoing examples it may readily be seen that the catalyst of the present invention promotes highly selective cracking reactions. Although Examples I and II illustrate that an aluminum chloride-hydrogen chloride mixture forms a very active cracking catalyst, the poor liquid yields as well as the large formation of normally gaseous material and coke causes a commercial process using this catalyst to be impractical. Example III illustrates that the use of the catalyst of the present invention significantly increases the liquid yield of product and significantly decreases the formation of normally gaseous material and coke while Example IV illustrates that the use of the catalyst of this invention significantly increases the proportion of gasoline formed in relation to the amount of gaseous material and coke. Examples V and VI illustrate the use of the catalyst of this invention for converting a Mid-Continent gas oil and these results compared with Example II show the improvement obtained by using this catalyst.

I claim as my invention:

1. The process of hydrocracking a hydrocarbon fraction which comprises contacting said fraction at cracking conditions in the presence of hydrogen with a catalyst comprising hydrogen chloride, titanium tetrachloride and a member of the group consisting of aluminum metal and aluminum chloride.

2. The process of claim 1 further characterized in that said hydrocarbon fraction is an oil heavier than gasoline.

3. The process of hydrocracking a hydrocarbon oil heavier than gasoline which comprises contacting said oil at cracking conditions in the presence of hydrogen with a catalyst comprising hydrogen chloride, aluminum, and titanium tetrachloride.

4. The process of hydrocracking a hydrocarbon oil heavier than gasoline which comprises contacting said oil at cracking conditions in the presence of hydrogen with a catalyst comprising hydrogen chloride, aluminum chloride, and titanium tetrachloride.

References Cited in the file of this patent

UNITED STATES PATENTS

| | | |
|---|---|---|
| 1,854,146 | Galle et al. | Apr. 12, 1932 |
| 2,221,952 | Pier et al. | Nov. 19, 1940 |
| 2,299,716 | Van Peski | Oct. 20, 1942 |

OTHER REFERENCES

Hackh's Dictionary, third edition, 1944, pages 282 and 283. The Blakiston Co., Philadelphia, Pa.